Feb. 12, 1952         C. J. WEYRAUCH         2,585,063
SAW SHARPENER WITH MOTOR-DRIVEN ROTARY SHARPENERS
Filed June 16, 1950                     2 SHEETS—SHEET 1
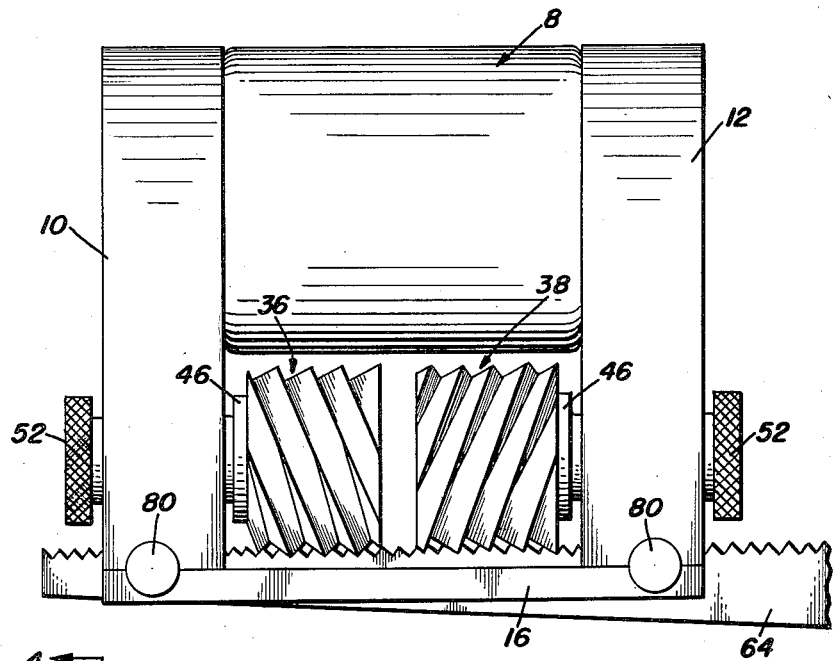
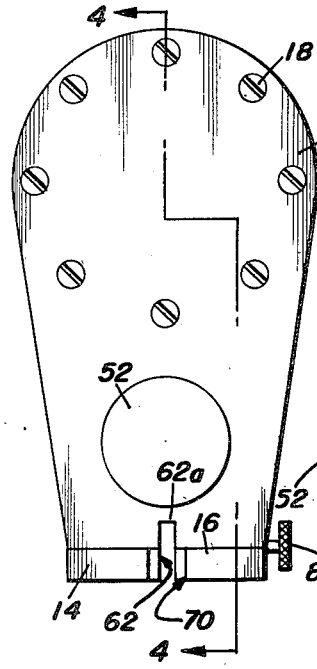
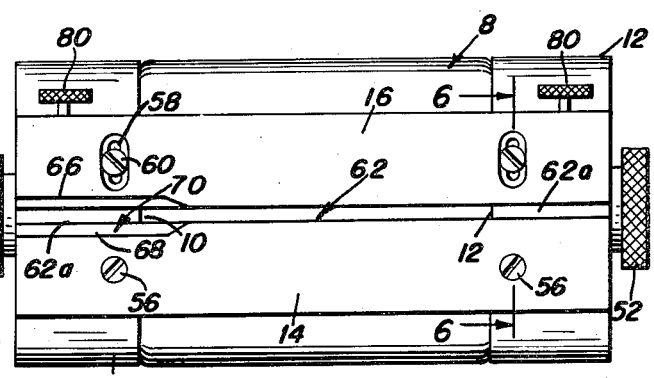
Cyril J. Weyrauch INVENTOR.

Feb. 12, 1952 — C. J. WEYRAUCH — 2,585,063
SAW SHARPENER WITH MOTOR-DRIVEN ROTARY SHARPENERS
Filed June 16, 1950 — 2 SHEETS—SHEET 2
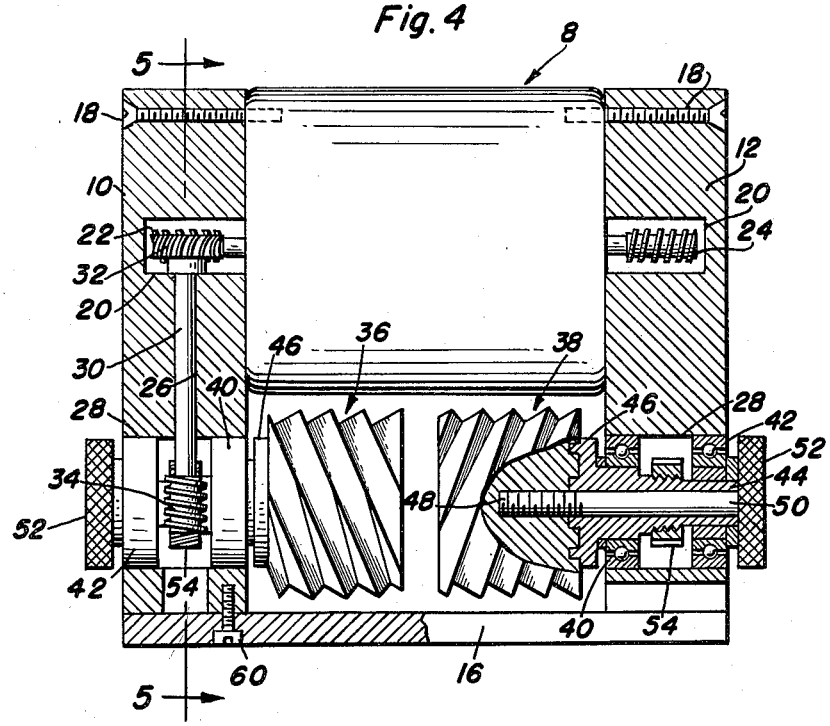
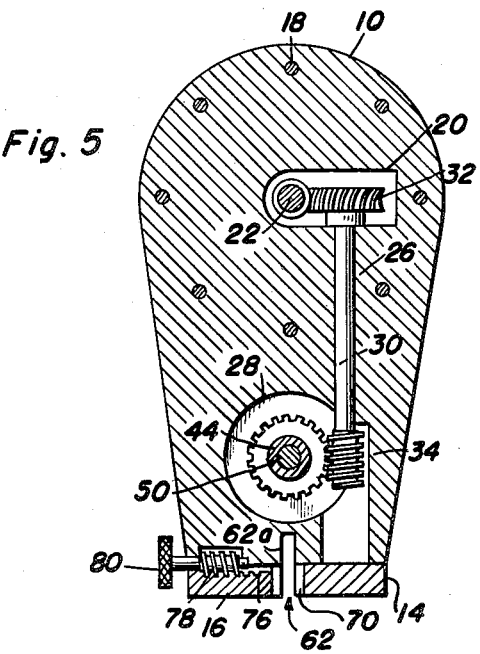
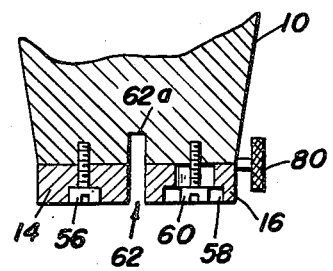
Cyril J. Weyrauch
INVENTOR.
BY Clarence A. O'Brien
and Harvey B. Jackson
Attorneys Patented Feb. 12, 1952

2,585,063

UNITED STATES PATENT OFFICE 2,585,063

SAW SHARPENER WITH MOTOR-DRIVEN
ROTARY SHARPENERS

Cyril J. Weyrauch, Ray, N. Dak.

Application June 16, 1950, Serial No. 168,423

5 Claims. (Cl. 76—38)

The present invention relates to sharpening tools and devices for saws, particularly hand saws with straight blades and has more particular reference to a structure employing a pair of axially aligned rotary files driven in opposite directions to not only successively sharpen the teeth but to cause the device to travel from one to the other end of the blade.

More specifically, the invention has to do with a sharpener wherein a small electric motor is aptly employed to deliver the needed operating power to the rotary files, whereby to attain satisfactory ends with accompanying mechanical advantages.

A more general object of the invention is to provide a sharpener construction in which manufacturers, users and others will find long wanted needs fully met, contained and available.

In carrying out a preferred embodiment of the invention and to insure requisite compactness, convenience, and mechanical simplicity, I utilize a motor construction which is interposed between spaced parallel head plates. The head plates have a pair of spaced parallel guide plates attached thereto and are provided with novel bearing assemblies for driven shafts forming significant components of twin rotary files.

Then, too, additional novelty resides, it is believed, in utilizing head plates which combine with the motor in providing a suitable sturdy frame structure and which have requisite coacting passages not only for the oppositely extending motor shafts but for additional power takeoff shafts which are geared to the motor shafts and also geared to the rotary cutter shafts, whereby to thus provide an overall structural assemblage of appreciable simplicity and outstanding structural utility.

What is more, novelty is predicated on a head plate having a simple hole which provides a space and mount for a novel tool, and hub structure forming a part of the tool, which hub structure is characterized by bearings, a gear equipped hollow shaft, a head on the shaft to which the tool per se is connected, and a clamping bolt.

Other objects and advantages will become more readily apparent from the following description and the accompanying illustrative drawings:

In the accompanying drawings wherein like numerals are employed to designate like parts throughout the views:

Figure 1 is an elevational view of a saw sharpener constructed in accordance with the principles of the invention, showing the overall construction of same as devised by me;

Figure 2 is an end elevation observing the structure in a direction from left to right, that is, the structure shown in Figure 1;

Figure 3 is a bottom plan view of the same;

Figure 4 is a view in section and elevation which may be said to be taken substantially on the plane of the irregular section line 4—4 of Figure 2, looking in the direction of the arrows;

Figure 5 is a vertical transverse section taken on the line 5—5 of Figure 4, looking in the direction of the arrows; and, Figure 6 is a view on the line 6—6 of Figure 3, also looking in the direction of the arrows.

The substantially rectangular framework, which is sufficiently light in weight and small in size to enable same to be carried in a tool box such as used by a carpenter, is characterized by a small electric motor 8, a pair of substantially duplicate head plates 10 and 12, and a pair of substantially rectangular bottom plates 14 and 16. The head or end plates 10 and 12 are secured by bolts or the like 18 to the opposite end portions of the electric motor housing. The plates 10 and 12 are provided with suitable recesses 20—20 to accommodate the extending shafts 22 and 24 projecting from opposite end portions of the motor. These shafts are provided with worm threads in the manner shown. The end plates are also provided with longitudinally extending bores 26 which communicate with recesses 20 at their upper ends and communicate at their lower ends with transverse hub accommodation holes 28—28. These bores serve to accommodate the power take-off shafts 30 which are provided with suitable gears 32 on their upper ends in mesh with the driving worms 22 and 24. The shafts 30 are in turn provided at their lower ends with similar driven worms 34 which project into the aforementioned hub openings 28.

The cutting tools or rotary files are the same in each case and while they are identified as right and left rotary files 36 and 38, respectively, a description of one will suffice for both. Starting with the hub structure, this comprises ball bearing equipped units 40 and 42 which are plugged into and close the opposite ends of the hub opening 28. (See Figure 4.) These bearings serve to support the tubular tool shaft 44. This is provided on its inner end with an adapter head 46 which is properly constructed to permit the helically threaded tool 38 to be attached thereto. The tool 38 is thus detachably keyed to the head 46. To maintain the parts together the tool is provided with a screw-threaded socket to accommodate the screw-threaded end portion 48 of the assembling and clamping bolt 50. This passes through the bore in the tubular shaft and it is provided on its outer end with an appropriately knurled thumb wheel 52. The tubular shaft is provided with a worm gear 54 to accommodate the threads on the worm 34. With this arrangement the collar or tubular tool shaft 44 may be fitted into the bearing 40 and the two placed in the opening 28 from left to right. The gear 54 may be threaded on the shaft and then the bearing assembly 42 put in position. Then by passing the bolt 50 through the bore in the tubular shaft, the ribbed or threaded tool head 38 may be assembled and clamped in place. It will be evident that this assemblage in a tool construction is characterized by simplicity, durability, adaptability and other prerequisites which will appeal to manufacturers and users alike.

Referring again to the guide plates 14 and 16, it will be seen that the plate 14 is screwed, as at 56, to the coacting portions of the heads 10 and 12. The other plate 16 is provided with elongated slots 58 to accommodate similar screws 60 which are threaded in place and serve to adjustably attach plate 16. The two plates form an accommodation slot 62 for the blade of the saw 64. The aforementioned head plates 10 and 12 have blade accommodation notches 62ᵃ in registry with said slot 62. The plates 14 and 16 have offset end portions at the left as shown at 66 and 68 which provide an enlarged clearance and piloting slot 70. This slot 70 will assist the user in initially bringing the plates 14 and 16 into operating positions. That is to say, said slot is amply wide to aid one in fitting the toothed portion of the saw blade correctly in slots 62 and 62ᵃ in order that 36 and 38 may come into play. Otherwise considered, the gap or slot 70 is to enable the operator to set the whole device down upon the first two or three teeth of the saw blade without blocking interference from said teeth.

It will be noticed, in Figure 5, that the adjustable guide plate 16 is provided adjacent opposite ends with transverse racks 76 to accommodate adjusting screws 78 provided with finger grips 80.

By using the adjustment means 76, 78 and 80, it is obvious that plate 16 may be shifted toward and from plate 14 to regulate the width of the blade slot 62. Then the screws 60 can be tightened up to hold the plate 16 in its established position.

With the toothed blade of the saw in a retaining slot in a table or other support and with the oppositely disposed helical cutting threads of the cutters or files 36 and 38 engaged with the saw teeth as shown in Figure 1, with the lugs resting true on the table, and with the motor started, it is obvious that the device may be shifted back and forth on the saw teeth with all teeth being properly sharpened in proper sequence or progression.

As before implied, twin-type oppositely rotating sharpening and feeding files on a hand operated frame structure are old. Ordinarily, however, the means for generating and transmitting power is mechanical and manually actuatable. Obviously, I do not claim that it is new merely to substitute an electric motor for a hand crank or equivalent manual drive. The novelty is predicated on utilizing the motor as a hand grip and interposing the same between two head plates and carefully constructing the head plates to mount the necessary shaft means and bearing means thereon. The specific tool devices made as shown at the right in Figure 4 are novel and the fixed and adjustable guide plates 14 and 16 appear to be specifically distinct.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having thus described the invention, what is claimed as new is:

1. A straight saw blade sharpening device of the class shown and described comprising an electric motor, a pair of spaced parallel head plates secured to the respective ends of said motor, corresponding end portions of said plates having bearing means incorporated therein, tubular shafts mounted in the respective bearing means, the opposed inner ends of said shafts being provided with tool mounting heads, tools detachably mounted on said heads, clamping bolts mounted in said shafts and connected with said tools, said electric motor having power transmitting shafts projecting from its opposite ends into recesses provided therefor in said head plates, operating connections between said tubular and motor shafts, and a pair of spaced parallel guide plates attached to said head plates and parallel to said motor.

2. The structure defined in claim 1, wherein one of said guide plates is fixed and the other is movable and adjustable toward and from the fixed one and provided with rack means, and manually regulatable gear means for actuating and adjusting said rack means.

3. In a saw blade sharpening device of the class described, a portable frame structure embodying an electric motor, a pair of spaced parallel head plates removably mounted on opposite end portions of the motor housing and extending at right angles from the axis of the housing, and a pair of guide plates spaced apart, parallel to the motor and at right angles to the head plates and attached to said head plates, at least one of said head plates being provided with a hub hole, a tubular tool shaft, bearings therefor, said bearings being mounted removably in said hole, said tool shaft being provided with a gear, said tool shaft being further provided with a tool attaching head, a centrally socketed tool removably keyed on said head, a bolt passing through the bore in said tubular shaft and having its screw-threaded ends screwed into the socket in said tool, said bolt being provided on its opposite end with a thumb wheel available for operation beyond the adjacent bearing.

4. A sharpening device for a carpenter's saw comprising a portable electric motor having shafts extending axially beyond opposite ends of its housing, a pair of spaced parallel head plates removably bolted to opposite ends of the motor housing, said plates having recesses to accommodate said shaft and said shafts having worm screws thereon, said head plates being provided with longitudinal bores, said bores opening at the upper ends into said recesses, said head plates being provided at their lower ends with hub openings, the lower ends of said bores opening into said hub openings, power take-off shafts mounted for rotation in said bores and having gears on their upper ends located in said recesses and in mesh with said worm screws, the lower ends of said power take-off shafts extending into said hub openings, a pair of complemental tools having hub means removably mounted in said hub openings and said hub means including gears with which the worm screws on the power take-off shafts are connected, a pair of guide plates removably attached to lower end portions of said head plates and extending at right angles to the head plates and being parallel with the motor and tools, said guide plates being spaced apart to provide slot means for the saw blade.

5. A sharpening device for a carpenter's saw comprising a portable electric motor having shafts extending axially beyond opposite ends of its housing, a pair of spaced parallel head plates removably bolted to opposite ends of the motor housing, said plates having recesses to accommodate said shaft and said shafts having worm screws thereon, said head plates being provided with longitudinal bores, said bores opening at the upper ends into said recesses, said head plates being provided at their lower ends with hub openings, the lower ends of said bores opening into said hub openings, power take-off shafts mounted for rotation in said bores and having gears on their upper ends located in said recesses and in mesh with said worm screws, the lower ends of said power take-off shafts extending into said hub openings, a pair of complemental tools having hub means removably mounted in said hub openings and said hub means including gears with which the worm screws on the power take-off shafts are connected, a pair of guide plates removably attached to lower end portions of said head plates and extending at right angles to the head plates and being parallel with the motor and tools, said guide plates being spaced apart to provide slot means for the saw blade, and adjustment means for one of said guide plates whereby the plates may be adjusted in respect to each other to either enlarge or decrease the width of the saw blade slot.

CYRIL J. WEYRAUCH.

REFERENCES CITED

The following references are of record in the file of this patent:

UNITED STATES PATENTS

| Number | Name | Date |
| --- | --- | --- |
| 467,209 | Strobel | Jan. 19, 1892 |
| 660,105 | Green | Oct. 23, 1900 |
| 675,025 | Stratton | May 28, 1901 |
| 1,023,406 | Akerman | Apr. 16, 1912 |
| 1,390,501 | Clarke | Sept. 13, 1921 |
| 1,540,591 | Barker | June 2, 1925 |
| 1,756,399 | Stowell | Apr. 29, 1930 |
| 1,920,364 | Degen | Aug. 1, 1933 |
| 2,088,402 | Borck | July 27, 1937 |